US010021383B2

(12) United States Patent
Wang et al.

(10) Patent No.: US 10,021,383 B2
(45) Date of Patent: Jul. 10, 2018

(54) METHOD AND SYSTEM FOR STRUCTURAL SIMILARITY BASED PERCEPTUAL VIDEO CODING

(75) Inventors: Zhou Wang, Waterloo (CA); Abdul Rehman, Kitchener (CA)

(73) Assignee: SSIMWAVE INC., Waterloo, ON (CA)

( * ) Notice: Subject to any disclaimer, the term of this patent is extended or adjusted under 35 U.S.C. 154(b) by 343 days.

(21) Appl. No.: 14/123,009

(22) PCT Filed: May 29, 2012

(86) PCT No.: PCT/CA2012/000519
§ 371 (c)(1),
(2), (4) Date: Feb. 7, 2014

(87) PCT Pub. No.: WO2012/162806
PCT Pub. Date: Dec. 6, 2012

(65) Prior Publication Data
US 2014/0140396 A1    May 22, 2014

Related U.S. Application Data

(60) Provisional application No. 61/492,081, filed on Jun. 1, 2011, provisional application No. 61/523,610, filed on Aug. 15, 2011.

(51) Int. Cl.
*H04N 19/126*    (2014.01)
*H04N 19/91*    (2014.01)
(Continued)

(52) U.S. Cl.
CPC ..... *H04N 19/00096* (2013.01); *H04N 19/126* (2014.11); *H04N 19/154* (2014.11);
(Continued)

(58) Field of Classification Search
None
See application file for complete search history.

(56) References Cited

U.S. PATENT DOCUMENTS 5,911,006 A * 6/1999 Funamoto .............. G06T 9/00
348/403.1
6,529,236 B1 * 3/2003 Watanabe ............ H04N 1/2112
348/230.1
(Continued)

FOREIGN PATENT DOCUMENTS

CN    101409835 A    4/2009
CN    101578880 A    11/2009

OTHER PUBLICATIONS

WIPO, International Search Report and Written Opinion for PCT/CA2012/000519 dated Sep. 4, 2012.
(Continued)

*Primary Examiner* — Kate Luo
(74) *Attorney, Agent, or Firm* — Norton Rose Fulbright Canada LLP; Niall Cooney

(57) ABSTRACT

The present invention is a system and method for video coding. The video coding system may involve a structural similarity-based divisive normalization approach, wherein the frame prediction residual of the current frame may be transformed to form a set of coefficients and a divisive normalization mechanism may be utilized to normalize each coefficient. The normalization factor may be designed to reflect or approximate the normalization factor in a structural similarity definition. The Lagrange parameter for RDO for divisive normalization coefficients may be determined by both the quantization step and a prior distribution function of the coefficients. The present invention may generally be utilized to improve the perceptual quality of decoded video without increasing data rate, or to reduce the data rate of compressed video stream without sacrificing the perceived quality of decoded video. The present invention has shown to significantly improve the coding efficiency of MPEG4/H.264 AVC and HEVC coding schemes. The present invention may be utilized to create video codes compatible with
(Continued)

prior art and state-of-the-art video coding standards such as MPEG4/H.264 AVC and HEVC. The present invention may also be utilized to create video codecs incompatible with existing standards, so as to further improve the coding gain.

19 Claims, 9 Drawing Sheets

(51) Int. Cl.
    *H04N 19/61*     (2014.01)
    *H04N 19/18*     (2014.01)
    *H04N 19/19*     (2014.01)
    *H04N 19/154*     (2014.01)

(52) U.S. Cl.
    CPC ............. *H04N 19/18* (2014.11); *H04N 19/19* (2014.11); *H04N 19/61* (2014.11)

(56) References Cited

U.S. PATENT DOCUMENTS

| | | | |
|---|---|---|---|
| 2008/0013839 A1* | 1/2008 | Kimura | H04N 19/176 382/233 |
| 2009/0180555 A1 | 7/2009 | Sun et al. | |
| 2010/0067574 A1 | 3/2010 | Knicker et al. | |
| 2010/0329333 A1 | 12/2010 | Haskell et al. | |

OTHER PUBLICATIONS

Wang et al., Video Quality Assessment Based on Structural Distortion Measurement, Signal Processing: Image Communication, Jan. 2004, pp. 1-9, vol. 19, No. 1.
European Patent Office, Supplementary European Search Report for EP Application No. 12792354.8 dated Mar. 19, 2015.
Shiqi Wang et al, SSIM based perceptual distortion rate optimization coding, Jul. 11, 2010, vol. 7744, Institute of Digital Media, Peking University, China.
Abdul Rehman et al, Reduced-Reference Image Quality Assessment by Structural Similarity Estimation, IEEE Transactions on Image Processing, Aug. 2012, pp. 3378-3389, vol. 21, No. 8.
Shiqi Wang et al, SSIM-Motivated Rate-Distortion Optimization for Video Coding, IEEE Transactions on Circuits and Systems for Video Technology, Apr. 2012, pp. 516-529, vol. 22, No. 4.
Shiqi Wang et al, Perceptual Video Coding Based on SSIM-Inspired Divisive Normalization, Apr. 2013, pp. 1418-1429, IEEE Transactions on Image Processing, vol. 22, No. 4.
Chun-Ling Yang et al., An SSIM-Optimal H.264/AVC Inter Frame Encoder, Intelligent Computing and Intelligent Systems, 2009, IEEE International Conference on, pp. 291-295, Shanghai.
Rabbani et al., An overview of the JPEG2000 still image compression standard, Signal Processing: Image Communication, 2002, pp. 3-48, vol. 17, No. 1, Elsevier Science B.V.
Tao-Sheng Ou et al., SSIM-Based Perceptual Rate Control for Video Coding, IEEE Transactions on Circuits and Systems for Video Technology, May 2011, vol. 21, No. 5, pp. 682-691.
Huang et al., Perceptual Rate-Distortion Optimization Using Structural Similarity Index as Quality Metric, IEEE Transactions on Circuits and Systems for Video Technology, Nov. 2010, vol. 20, No. 11, pp. 1614-1624.
Chinese State Intellectual Property Office, Office Action for CN Application No. 201280037758.1 dated Jul. 25, 2016.
Chinese State Intellectual Property Office, Search Report for CN Application No. 201280037758.1 dated Jul. 27, 2016.
SIPO, Office Action for CN Application No. 201280037758.1 dated Aug. 18, 2017.
SIPO, Second Office Action for CN Application No. 201280037758.1 dated Mar. 6, 2017.
SIPO, Search Report for CN Application No. 201280037758.1 dated Mar. 6, 2017.

\* cited by examiner

METHOD AND SYSTEM FOR STRUCTURAL SIMILARITY BASED PERCEPTUAL VIDEO CODING

CROSS-REFERENCE TO RELATED APPLICATIONS

The present application claims the benefit of U.S. Provisional Application No. 61/492,081 filed on Jun. 1, 2011, and U.S. Provisional Application No. 61/523,610 filed on Aug. 15, 2011, the entirety of which are incorporated herein.

FIELD OF THE INVENTION

This invention relates in general to video coding and more particularly to video coding that uses structural similarity-based approaches to improve the perceptual quality of decoded video without increasing data rate, or to reduce the data rate of compressed video stream without sacrificing perceived quality of the decoded video.

BACKGROUND OF THE INVENTION

Digital images are subject to a wide variety of distortions during acquisition, processing, compression, storage, transmission and reproduction, any of which may result in a degradation of visual quality. For applications in which images are ultimately to be viewed by human beings, the most reliable method of quantifying visual image quality is through subjective evaluation. In practice, however, subjective evaluation is usually too inconvenient, time-consuming and expensive.

Objective image quality metrics may predict perceived image quality automatically. The simplest and most widely used quality metric is the mean squared error (MSE), computed by averaging the squared intensity differences of distorted and reference image pixels, along with the related quantity of peak signal-to-noise ratio (PSNR). But they are found to be poorly matched to perceived visual quality. In the past decades, a great deal of effort has gone into the development of advanced quality assessment methods, among which the structural similarity (SSIM) index achieves an excellent trade-off between complexity and quality prediction accuracy, and has become the most broadly recognized perceptual image/video quality measure by both academic researchers and industrial implementers.

In general, video coding often involves finding the best trade-off between data rate R and the allowed distortion D. Existing video coding techniques use the sum of absolute difference (SAD) or sum of square difference (SSD) as the model for distortion D, which have been widely criticized in the literature because of their poor correlation with perceptual image quality. There have also been attempts to define D based on SSIM, and develop rate-SSIM optimization methods for video coding.

Thus, what is needed is an improved solution which addresses the limitations as outlined above.

SUMMARY OF THE INVENTION

In one aspect, the present disclosure relates to a method for perceptual video coding utilizing a structural similarity-based divisive normalization mechanism to improve video coding schemes, for which examples include MPEG/H.264 AVC standard, and high efficiency video coding (HEVC).

In another aspect, the present disclosure relates to a method for perceptual video coding utilizing a divisive normalization approach, comprising at least the following steps: producing a prediction residual by subtracting a current frame of video footage from a prediction from one or more previously coded frames while coding the current frame; transforming the prediction residual to form a set of coefficients; utilizing a divisive normalization mechanism to normalize each coefficient; and performing a rate-distortion optimization, quantization and entropy coding on the normalized coefficients.

In another aspect, the present disclosure relates to computing the divisive normalization factor adaptively for each transform coefficient, so as to reflect or approximate the normalization factor in a structural similarity index, by utilizing information in either pixel or transform domain or both, and information from at least one of the following: the original current frame being encoded; the decoded versions of previously encoded neighbouring frames; the predicted current frame from previously coded frames; and the prediction residual.

In yet another aspect, the present disclosure relates to performing rate-distortion optimization (RDO) in the divisive normalization transform domain, where the optimal Lagrange parameter is determined by both quantization step and a prior distribution of the transform coefficients.

In yet another aspect, the present disclosure relates to a method for perceptual video coding comprising the steps of: producing a prediction residual by subtracting a current frame of video footage from a prediction from one or more previously coded frames while coding the current frame; transforming the prediction residual to form a set of coefficients; utilizing a divisive normalization mechanism to normalize each coefficient; and performing a rate-distortion optimization, quantization and entropy coding on the normalized coefficients; and further comprising the steps of: utilizing the divisive normalization mechanism to normalize each coefficient by determining a divisive normalization factor; approximating the normalization factor in a structural similarity index, by utilizing information in either pixel or transform domain or both, and information from at least one of the following: the current frame being encoded; the decoded versions of the one or more previously coded frames that are neighbouring frames to the current frame; the predicted residual of the current frame from one or more previously coded frames; and the prediction residual of the current frame; and still further comprising the step of determining the divisive normalization factor based on estimating energy of AC coefficients in the current frame by applying a scale factor to energy of corresponding coefficients in the one or more previously coded frames or a prediction of the current frame.

In an embodiment, the method further comprises computing the structural similarity-based divisive normalization factor for each MB/transform unit (TU) by dividing it to smaller blocks of equal size in the whole frame and then average the divisive normalization factors for all small blocks within the MB/TU.

In another embodiment, the method further comprises normalizing a local structural similarity-based divisive normalization factor for each MB/TU based on the expected value of local structural similarity-based divisive normalization factors of the whole frame being encoded.

In another embodiment, the method further comprises adjusting the divisive normalization factors based on the local content of the video frame, where the content may be characterized by a local complexity measure computed as local contrast, local energy or local signal activities.

In another embodiment, the method further comprises spatially adapting the structural similarity-based divisive normalization factor computation for each TU, which may be blocks with variable sizes across space.

In one embodiment, the present invention can be made compatible with the current and upcoming video coding standards (for example, the state-of-the-art MPEG4/H.264 AVC standard, and the upcoming high efficiency video coding or HEVC codec) to significantly improve their coding efficiency. In another embodiment, when standard compatibility is not required, the present invention can modify upon the current and upcoming video coding standards (for example, the state-of-the-art MPEG4/H.264 AVC standard, and the upcoming HEVC codec) to improve their coding efficiency to even higher levels.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

The invention will be better understood and objects of the invention will become apparent when consideration is given to the following detailed description thereof. Such description makes reference to the annexed drawings wherein.

Figure 1:
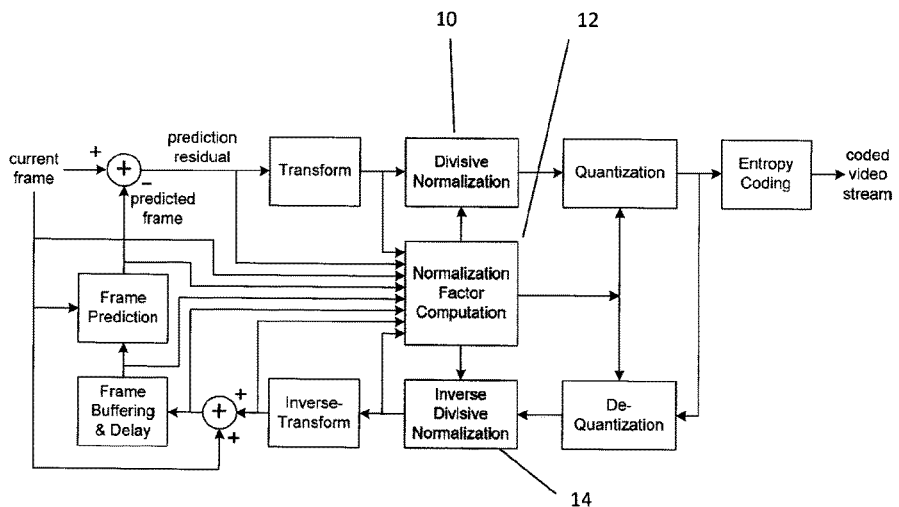
FIG. 1 is a flow-chart showing the steps of a divisive normalization architecture in predictive video encoding in accordance with an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present disclosure relates to a system, method and computer program product for video coding.

In one aspect, the present system and method utilizes a structural similarity (SSIM)-based divisive normalization mechanism to improve video coding schemes, for which examples include MPEG/H.264 AVC standard and high efficiency video coding (HEVC). In an SSIM-based divisive normalization approach, the frame prediction residual of the current frame may be transformed to form a set of coefficients and a divisive normalization mechanism may be utilized to normalize each coefficient. The normalization factor may be designed to reflect or approximate the normalization factor in SSIM definition. The Lagrange parameter for rate distortion optimization (RDO) for divisive normalization coefficients may be determined by both the quantization step and a prior distribution function of the coefficients. The present invention may generally be utilized to improve the perceptual quality of decoded video without increasing data rate, or to reduce the data rate of compressed video stream without sacrificing the perceived quality of decoded video.

In one embodiment of the present invention, the video coding system may involve a predictive coding scheme wherein the current frame may be subtracted from a prediction from one or more previously coded frames while coding a current frame to produce a prediction residual. The prediction residual may be transformed to form a set of coefficients, for example, DCT coefficients. A divisive normalization mechanism may be utilized to normalize each coefficient. The normalization factor may be designed to reflect or approximate the normalization factor in SSIM measure. The Lagrange parameter for RDO for divisive normalization coefficients may be determined by the quantization step and/or a prior distribution function of the coefficients. Quantization and entropy coding may be applied to the normalized coefficients to produce compressed video stream. The present invention may generally be utilized to improve the perceptual quality of decoded video without increasing data rate, or to reduce the data rate of compressed video stream without sacrificing the perceived quality of decoded video.

In general, divisive normalization is recognized as a perceptually and statistically motivated non-linear image representation model. It is shown to be a useful framework that accounts for the masking effect in human visual system, which refers to the reduction of the visibility of an image component in the presence of large neighboring components. It has also been found to be powerful in modeling many neuronal responses in biological perceptual systems. Prior art video coding has not incorporated SSIM into video coding framework using divisive normalization method. The present invention does incorporate SSIM into video coding framework using a divisive normalization method and supporting system, as described herein.

The SSIM index may offer benefits and advantages by better representing perceptual image quality. An image signal whose quality is being evaluated may represent a sum of an undistorted reference signal and an error signal. Prior art methods may objectively quantify the strength of the error signal. However, two distorted images may have the same error signal, but have very different types of errors that vary in visibility. Consequently, the prior art image quality assessment systems have a significant limitation because these systems are bottom-up approaches that are complex and rely on a number of strong assumptions and generalizations. The use of the SSIM index enables a top-down approach that recognizes that the human visual system is highly adapted to extract structural information from the viewing field. It applies a measure of structural information change to provide an approximation to perceived image distortion. Variances in image distortion can therefore be recognized by the SSIM index, which are not distinguishable through utilization of the prior art methods and systems.

The SSIM measure may be defined in either pixel or transform domain. In pixel domain, the SSIM between two groups of pixels may be one or more of the following components: (i) the ratio between [the product of the mean intensity values of the two groups of pixels plus a constant] and [one, or the sum, of the squared mean intensity values plus a constant]; (ii) the ratio between [the product of the standard deviation values of both groups of pixels plus a constant] and [signal energy based on one, or the sum, of the variances of the two groups of pixels plus a constant]; or (iii) the ratio between [the cross-correlation between two groups of pixel intensities plus a constant] and [the product of the standard deviation values of the two groups of pixels plus a constant]. The standard definition of SSIM is the product of the following three components $$l(x, y) = \frac{2\mu_x \mu_y + C_1}{\mu_x^2 + \mu_y^2 + C_1},$$

$$c(x, y) = \frac{2\sigma_x \sigma_y + C_2}{\sigma_x^2 + \sigma_y^2 + C_2},$$

$$s(x, y) = \frac{\sigma_{xy} + C_3}{\sigma_x \sigma_y + C_3},$$

where $\mu_x$, $\sigma_x$, and $\sigma_{xy}$ denote mean, standard deviation and cross correlation, respectively; $C_1$, $C_2$ and $C_3$ are constants used to avoid instability when the means and variances are close to zero. However, there may be other variations, for example, (i) using one of two of the three components only; (ii) raising one or more of the components to certain power; (iii) using summation rather than multiplication to combine the components; or (iv) using one but not both of the $\mu$ and $\sigma$ terms in the denominators.

The SSIM index may also be defined using transform domain coefficients, for example, DCT coefficients. The SSIM between two groups of transform coefficients may be computed using one or more of the following components: (i) the ratio between [the product of DC values plus a constant] and [one, or the sum, of DC intensity values plus a constant]; and (ii) ratio between [the cross-correlation between two groups of AC coefficients plus a constant] and [signal energy based on the variance(s) of one or both groups of AC coefficients plus a constant]. The DCT domain SSIM between two sets of coefficients X and Y may be computed as $$SSIM(x, y) = \left\{ 1 - \frac{(X(0) - Y(0))^2}{X(0)^2 + Y(0)^2 + N \cdot C_1} \right\} \times \left\{ 1 - \frac{\sum_{k=1}^{N-1} (X(k) - Y(k))^2}{\sum_{k=1}^{N-1} X(k)^2 + Y(k)^2 + N \cdot C_2} \right\}$$

where X(0) and Y(0) are the DC coefficients, and X(k) and Y(k) for k=1, . . . , N−1 are AC coefficients, respectively; $C_1$ and $C_2$ are constants used to avoid instability when the means and variances are close to zero and N denotes the block size. As in the pixel domain case, similar variations in the definition of SSIM may also be applied here in the transform domain.

Should the normalization factors be computed in transform domain, for example DCT domain, the coefficients may be regrouped into subbands of the same frequency and orientation. For example, DCT coefficients at the same location in a DCT block but from all blocks in a frame may be grouped together to a DCT subband. The prior probability density function of each subband may be used to adjust the normalization factor of the corresponding coefficient.

As a benefit or advantage of the present invention over the prior art, generally prior art advanced video coding techniques predict the current frame to be encoded using predictions from previously coded frames. The prediction residual is transformed, such as, for example by using DCT, before quantization and entropy coding processes. The present invention does not apply the prior art standard approach but instead inserts a "divisive normalization", an "inverse divisive normalization", and a "normalization factor computation" modules into the framework.

The present system and method will now be described in more detail with reference to the figures.

Now referring to FIG. 1, shown is a flow-chart showing the steps of a divisive normalization architecture in predictive video encoding in accordance with an embodiment of the present invention. Generally prior art advanced video coding techniques predict the current frame to be encoded using predictions from previously coded frames. The prediction residual is transformed, such as, for example by using DCT, before quantization and entropy coding processes. The present invention does not apply the prior art standard approach but instead inserts a "divisive normalization", an "inverse divisive normalization", and a "normalization factor computation" modules into the framework. In this manner, the input links and output links may be associated with any or all of the divisional normalization module 10, the inverse divisive normalization module 14, and the normalization factor computation module 12.

In an embodiment of the present invention, the normalization factors may be computed based on accessible statistics in pixel and/or transform, such as, for example DCT, domain, from original and/or residual frames, and from the current and/or previously coded neighbouring frames. In one embodiment of the present invention the transform (DCT) domain variance statistics extracted from the prediction frame may be used to compute the normalization factors. The normalization factors may be further adjusted by the prior probability density function of each transform coefficient. The normalization factors may be designed to transform the signal to a perceptually uniform space based on SSIM as the perceptual criterion. The computed normalization factors may either be used to normalize the transform coefficients before regular quantization and entropy coding, or may be applied to scale the quantization step adaptively. Should the computed normalization factors be applied to scale the quantization step adaptively, the divisive normalization module and the inverse divisive normalization module may not be required.

Figure 2:
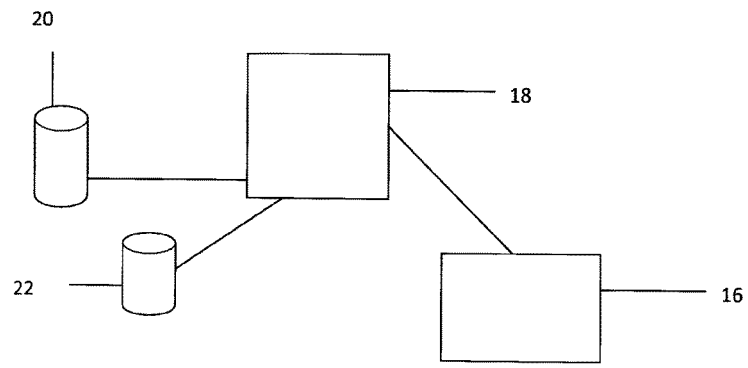
FIG. 2 is a system diagram of one embodiment of the system of the present invention.

Now referring to FIG. 2, shown is an illustrative system diagram of one embodiment of the system of the present invention that incorporates a frame capture component 18. The frame capture component may be operable to process current or historical frames in accordance with the method of the present invention disclosed herein. Historical frame, or results pertaining to historical frames, which may be prior frames or historical frame results may be obtained by the frame capture component. The one or more historical frames, or one or more historical frame results, may be obtained by the frame capture component in that the component retains such information once it has coded a historical frame as a prior frame. One or more historical frames and/or frame results may alternatively be accessed by, or otherwise transferred to, the frame capture component from a prior frame results repository 20.

Still referring to FIG. 2, the prior frame results repository may be separate from the frame capture component. The prior frame results repository may even be remotely located from the frame capture component. A connection, or any other type of link, may exist between the frame capture component and the prior frame results repository. The connection or link may be of various types, such as, for example a wireless link, a wired link, or other type of connections or links. The connection or link may be direct between the frame capture component and the prior frame results repository, or may be via a connection facilitator, such as, for example the Internet, a cloud, or any other type of connection facilitator. The connection or link may be operable to allow for the transfer of information between the frame capture component and the prior frame results repository. For example, the frame capture component may receive information from the prior frame results repository; the information may be one or more prior frames, or one or more prior frame results. The frame capture component may further send information to the prior frame results repository, such as one or more prior frames, or one or more prior frame results. The prior frame results repository may be connected to data storage means, such as a database located on a remote or local server, or the prior frame results repository may be capable of storing transferred information therein.

The frame capture component may receive information representing one or more frames. Said one or more frames may be provided to the frame capture component in a variety of manners. As one possible means of transfer of information, a frame repository 22, as shown in FIG. 2 may be connected or otherwise linked to the frame capture component. One or more frames may be provided to the frame capture component from the frame repository. Frames, being current frames, may be provided to the frame capture component in a variety of other methods as well, such as, for example by direct provision of video feed, or other feed of frames, to the frame capture component.

In an embodiment, the frame repository 22 may be separate from the frame capture component. The frame repository may even be remotely located from the frame capture component. A connection, or any other type of link, may exist between the frame capture component and the frame repository. The connection or link may be of various types, such as, for example a wireless link, a wired link, or other type of connections or links. The connection or link may be direct between the frame capture component and the frame repository, or may be via a connection facilitator, such as, for example the Internet, a cloud, or any other type of connection facilitator. The connection or link may be operable to allow for the transfer of information between the frame capture component and the frame repository. The frame capture component may receive information from the frame repository, the information may be one or more frames. The frame repository may be connected to a data storage means, such as a database located on a remote or local server, or the frame repository may be capable of storing transferred information therein. The frame repository may receive information from outside sources, including remote sources, and may be linked to such sources in a variety of manners, for example, such as by any of the types of links and connections described herein as possible links or connections between the frame repository and the frame capture component.

The frame capture component may receive or otherwise capture one or more frames, and may further receive, or otherwise obtain, one or more prior frames, or one or more prior frame results, corresponding to the one or more frames. The frame capture component may be linked to, or incorporate, a perceptual coding component 16. As shown in FIG. 2, the perceptual coding component may be separate, but linked to, the frame capture component 18. A skilled reader will recognize that the perceptual coding component may alternately be integrated in the frame capture component, or the perceptual coding component may be connected to, or linked to, the frame capture component in a variety of manners in embodiments of the present invention.

The perceptual coding component may be operable to code the one or more frames received by the frame capture component, in a manner described herein. The perceptual coding component may be operable to apply an SSIM-based divisive normalization approach of the present invention. In its operation the perceptual coding component may utilize the one or more prior frames, or one or more prior frame results, corresponding to the one or more frames received or otherwise obtained or captured by the frame capture component. The one or more frames and corresponding one or more prior frames and/or one or more prior frame results may be transferred, or otherwise provided to, the perceptual coding component by the frame capture component. The perceptual coding component may code the one or more frames and corresponding one or more prior frames and/or one or more prior frame results in a manner described herein, to produce results that may be utilized to improve the perceptual quality of decoded video without increasing data rate, or to reduce the data rate of compressed video stream without sacrificing perceived quality of the decoded video.

The frame capture component may be a coder, for example, such as a MPEG4/H.264 AVC coder, having a perceptual coding component connected thereto, or incorporated therein. The frame capture component, and any components linked thereto, may further be incorporated or connected to a coder device, or any computer system. In this manner, the system of the present invention may be incorporated in, or linked to, other systems. Such connected systems may be utilized to provide information, such as any results of the present invention, to one or more users. For example, the connected systems may include output means, such as a display screen. The connected systems may further be operable to transfer information to the present invention system, for example, such as to transfer one or more frames or one or more prior frames, or prior frame results, to the present invention or any component of the present invention system. A skilled reader will recognize the variety of ways that the present invention system and any of its components may be integrated with, or connected to, other systems.

Figure 3:
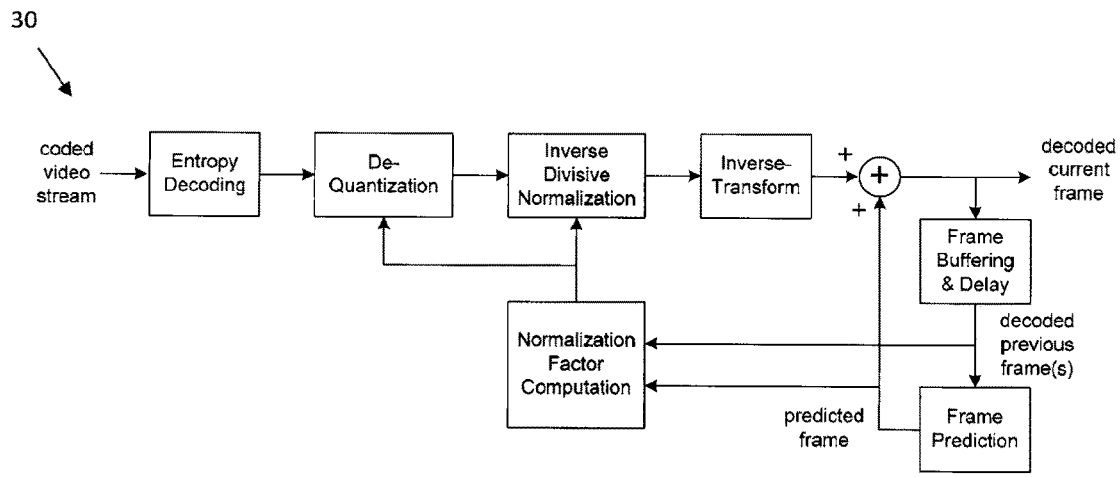
FIG. 3 is a flow-chart showing the steps of a divisive normalization architecture in predictive video decoding in accordance with an embodiment of the present invention.

FIG. 3 is a flow-chart showing the steps of a divisive normalization architecture in predictive video decoding in accordance with an embodiment of the present invention. As shown in FIG. 3, the coded video stream 30, which may represent a decoder side of the present invention, may be required to make one or more adjustments corresponding to the normalization factors used at the encoder in order to correctly decode the encoded video. More specifically, the present invention may not apply the prior art standard approach. Instead the present invention may insert an "inverse divisive normalization" module and a "normalization factor computation" module into the framework. The modules may correspond with normalization factor computation module 12 and inverse divisive normalization module 14 as shown in FIG. 1. The input links and output links of the modules may be associated with any or both of the inverse divisive normalization module and the normalization factor computation module.

In an embodiment of the present invention, a joint residual divisive normalization and rate distortion optimization (RDO) scheme may be utilized for video coding. This embodiment of the present invention may utilize the SSIM index and its derivation in DCT domain. The normalization factor may be obtained from the prediction macroblock (MB). As a result, the quantization matrix may be determined adaptively and no side information may be required to be transmitted from the encoder to the decoder. Additionally, based on the SSIM index, a new distortion model and a perceptual RDO scheme for mode selection may be involved in this embodiment of the present invention.

The present invention may involve predictive video coding framework, where previously coded frames are used to predict the current frame, and only the residuals after prediction is coded. In the present invention it may be possible to let C(k) be the $k^{th}$ DCT transform coefficient for residuals, then the normalized coefficient is computed as C'(k)=C(k)/f, where f is a positive normalization factor. The quantization of the normalized coefficients, for a given predefined $Q_s$, may be performed as follows $$Q(k) = \text{sign}\{C(k)'\}\text{round}\left\{\frac{|C(k)'|}{Q_s} + p\right\} \quad (1)$$

$$= \text{sign}\{C(k)\}\text{round}\left\{\frac{|C(k)|}{Q_s \cdot f} + p\right\}$$

where p is the rounding offset in the quantization. In the decoder, the de-quantization and reconstruction of C(k) is performed as $$R(k) = R(k)' \cdot f \quad (2)$$
$$= Q(k) \cdot Q_s \cdot f$$
$$= \text{sign}\{C(k)\}\text{round}\left\{\frac{|C(k)|}{Q_s \cdot f} + p\right\} \cdot Q_s \cdot f$$

The divisive normalization scheme of the present invention may be interpreted in two ways. An adaptive normalization factor may be applied, followed by quantization with a predefined fixed step $Q_s$. Alternatively, an adaptive quantization matrix may be defined for each MB and thus each coefficient may be quantized with a different quantization step $Q_s \cdot f$. These two interpretations may be equivalent.

In one embodiment of the present invention, the present invention has advantage over state-of-the-art high efficiency video coding (HEVC) as well. The current HEVC test model (HM) employs a quantization parameter (QP) scaling scheme that is similar to the MPEG4/H.264 AVC standard. The quantization step size applied to each transform coefficient may be determined approximately as $$Q_s = 2^{\frac{QP-4}{6}}.$$

The equation for the modified quantization step, $Q'_s$, can be written as $$Q'_s = f \cdot Q_s$$
$$= 2^{\frac{QP'-4}{6}}$$

where QP'=QP+ΔQP is the modified quantization parameter as a result of the divisive normalization process. The corresponding ΔQP as a function of the normalization factor, f, is given by ΔQP=6 log$_2$f.

Since f is real, ΔQP is not necessarily an integer, which provides fine tuning of the QP value of each coding unit in order to obtain the best perceptual quality.

At this point, the present invention may determine the ΔQP value in two different ways based on the application environment. In the first case, the video codec is not required to be compatible with the current/upcoming video coding standards (such as MPEG4/H.264 AVC or the upcoming HEVC). In this case, ΔQP=6 log$_2$f. is applied to determine ΔQP, leading to the maximal gain in terms of coding efficiency performance. In the second scenario, the video codec is required to be compatible with the current/upcoming video coding standards (such as MPEG4/H.264 AVC or the upcoming HEVC), which typically do not allow non-integer ΔQP values. Therefore in this case, the ΔQP=6 log$_2$ f. is quantized to the nearest integer. This leads to convenient deployment of the present invention in standard video codecs because there is no need to change the decoders at the receiver device (e.g., smartphones and HDTV sets) and only changes at the encoder side are required to adopt the present invention. This convenience may lead to small reduction of coding efficiency performance.

In determining the divisive normalization factor, the present invention may optimize the SSIM index and may use the denominators in DCT domain SSIM index to determine the normalization factor.

With the high rate assumption in video coding, the source probability distribution is approximately uniform and the MSE can be modeled by $$D_{MSE} = \alpha \cdot Q_s^2 \quad (3)$$

Considering (1) to (3), the present invention may divide each MB into/sub-MBs for DCT transform and $X_i(k)$ indicates the $k^{th}$ DCT coefficient in the $i^{th}$ sub-MB, and then the normalization factors for DC and AC coefficients in each MB are desired to be $$f_{dc} = \frac{\frac{1}{l}\sum_{i=1}^{l} \sqrt{X_i(0)^2 + Y_i(0)^2 + N \cdot C_1}}{E\left(\sqrt{X(0)^2 + Y(0)^2 + N \cdot C_1}\right)} \quad (4)$$

$$f_{ac} = \frac{\frac{1}{l}\sum_{i=1}^{l} \sqrt{\frac{\sum_{k=1}^{N-1}(X_i(k)^2 + Y_i(k)^2)}{N-1} + C_2}}{E\left(\sqrt{\frac{\sum_{k=1}^{N-1}(X(k)^2 + Y(k)^2)}{N-1} + C_2}\right)} \quad (5)$$

where E denotes the mathematical expectation operator.

These normalization factors may need to be computed at both the encoder and the decoder. The difficulties in practical implementation may be that the distorted MB is not available at the encoder before it is coded, and the original MB is completely inaccessible at the decoder. Fortunately, the prediction MB may be available at both encoder and decoder sides. Assuming that the properties of the prediction MB are similar to those of the original and distorted MBs, in one embodiment, the present invention may approximate the normalization factor as $$f'_{dc} = \frac{\frac{1}{l}\sum_{i=1}^{l} \sqrt{2Z_i(0)^2 + N \cdot C_1}}{E\left(\sqrt{2Z(0)^2 + N \cdot C_1}\right)} \quad (6)$$

$$f'_{ac} = \frac{\frac{1}{l}\sum_{i=1}^{l} \sqrt{\frac{\sum_{k=1}^{N-1}(Z_i(k)^2 + s \cdot Z_i(k)^2)}{N-1} + C_2}}{E\left(\sqrt{\frac{\sum_{k=1}^{N-1}(Z(k)^2 + s \cdot Z(k)^2)}{N-1} + C_2}\right)} \quad (7)$$

where $Z_i(k)$ is the $k^{th}$ DCT coefficient of the $i_{th}$ prediction sub-MB for each mode. For intra mode, the present invention may use the MB at the same position in the previous coded frame.

Since the energy of AC coefficients may be lost due to quantization, in on embodiment, the present invention may use a compensation factor s to bridge the difference between the energy of AC coefficients in the prediction MB and the original MB, $$s = \frac{E\left(\sum_{k=1}^{N-1} X(k)^2\right)}{E\left(\sum_{k=1}^{N-1} Z(k)^2\right)} \quad (8)$$

Figure 4:
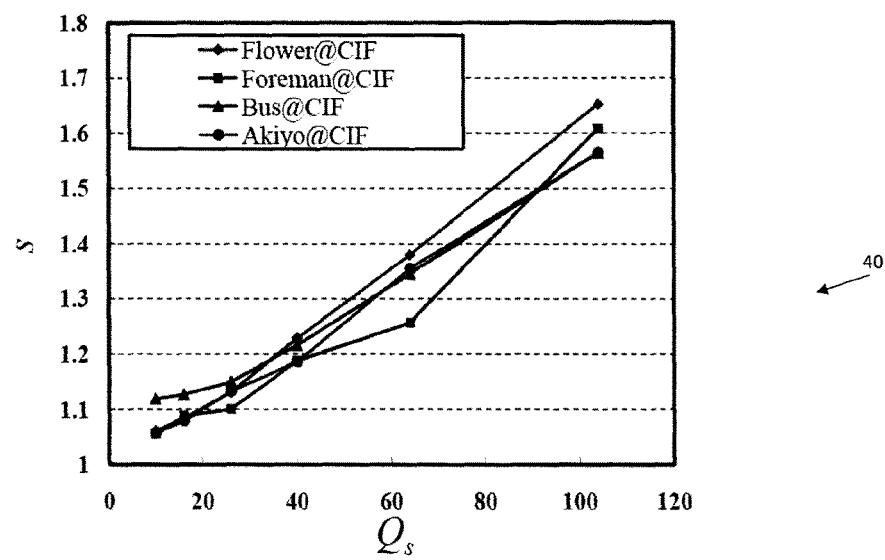
FIG. 4 is a graph illustrating the relationship between the energy compensation factor s (vertical axis) as a function of quantization step $Q_s$ (horizontal axis) in accordance with an embodiment of the present invention.

FIG. 4 illustrates a layout of two frames showing energy compensation factor s(vertical axis) as a function of quantization step $Q_s$(horizontal axis) in accordance with an embodiment of the present invention. The four curves show the results from four different standard test video sequences, which are "Flower", "Foreman", "Bus", and "Akiyo", respectively. All sequences are in CIF format.

Significantly, as shown in FIG. 4, s may exhibit an approximately linear relationship with $Q_s$ as shown on a $Q_s$ axis 40, the linear relationship may be modeled empirically as $$s = 1 + 0.005 \cdot Q_s \quad (9)$$

In one embodiment of the present invention, the normalization factors for DC and AC coefficients in each MB may also be defined alternatively as $$f_{dc} = \left(1 + \frac{\mu_x^2}{C_1}\right)\left(1 + \frac{\mu_y^2}{C_1}\right)$$

$$f_{ac} = \left(1 + \frac{\sigma_x^2}{C_2}\right)\left(1 + \frac{\sigma_y^2}{C_2}\right)$$

These normalization factors may need to be computed at both the encoder and the decoder. The difficulties may be that the distorted MB is not available at the encoder before it is coded, and the original MB is completely inaccessible at the decoder. Fortunately, the prediction MB may be available at both encoder and decoder sides. Assuming that the properties of the prediction MB are similar to those of the original and distorted MBs, in one embodiment, the present invention may approximate the normalization factor as $$f_{dc} = \left(1 + \frac{\mu_z^2}{C_1}\right)^2$$

$$f_{ac} = \left(1 + \frac{\sigma_z^2}{C_2}\right)\left(1 + \frac{s\sigma_z^2}{C_2}\right)$$

Where z represents the predicted sub-MB or transform unit (TU) and s is defined in equation (9).

Therefore, the present invention may define the quantization matrix for 4×4 DCT transform coefficients as $$WS_{ij} = 16 \cdot \begin{bmatrix} f'_{dc} & f'_{ac} & f'_{ac} & f'_{ac} \\ f'_{ac} & f'_{ac} & f'_{ac} & f'_{ac} \\ f'_{ac} & f'_{ac} & f'_{ac} & f'_{ac} \\ f'_{ac} & f'_{ac} & f'_{ac} & f'_{ac} \end{bmatrix} \quad (10)$$

These normalization factors may vary over space.

As shown in FIG. 4, s may exhibit an approximately linear relationship with $Q_s$ as shown on a $Q_s$ axis 40. FIG. 4 shows the results of four different standard test video sequences, including test video sequences for Flower, Foreman, Bus and Akiyo. Each test video sequence is in CIF format.

Energy compensation factor s may exhibit an approximately linear relationship with $Q_s$ in the present invention, as is illustrated for the four test video sequences plotted in the graph of FIG. 4.

The RDO process in video coding may be expressed by minimizing the perceived distortion D with the number of used bits R subjected to a constraint $R_c$. This can be converted to an unconstrained optimization problem as $$\min\{J\} \text{ where } J = D + \lambda \cdot R \quad (11)$$

where J is called the Rate Distortion (RD) cost and $\lambda$ is known as the Lagrange multiplier which controls the tradeoff between R and D.

In prior art RDO schemes, distortion models such as SAD and SSD are often used in actual implementations. The present invention may replace such distortion models used in the prior art with a new distortion model that may be consistent with the residual normalization process. The distortion model may be defined as the SSD between the normalized coefficients, which is expressed by $$D = \frac{(X(0) - Y(0))^2}{f_{dc}'^2} + \frac{\sum_{N=1}^{N-1}(X(k) - Y(k))^2}{f_{ac}'^2} \quad (12)$$

Based on (11), the RDO problem may be approximated as $$\min\{J\} \quad (13)$$

where $$J = \frac{(X(0) - Y(0))^2}{f_{dc}'^2}\lambda_{dc} \cdot R_{dc} + \frac{\sum_{n=1}^{N-1}(X(k) - Y(k))^2}{f_{ac}'^2} + \lambda_{ac} \cdot R_{ac}$$

In the divisive normalization domain, the distortion model may calculate the SSD between the normalized original and distorted DCT coefficients. Therefore, it may be treated as a Lagrange parameter selection problem as in SSD-optimization case. For example, if this method is incorporated in a coder, then it may be possible to choose $\lambda_{dc}$ and $\lambda_{dc}$ to be the same as their corresponding Lagrange parameters optimized to achieve the best encoding based on SSD criterion.

The above method may be further improved if the DCT normalization matrix in (10) is finetuned so that each AC coefficient has a different normalization factor. The present invention may define the Lagrange parameter $\lambda$ as a function of quantization step $Q_s$ and/or a prior probability distribution of the normalized coefficients. For example, the Laplace distribution may be utilized to model the prior distribution given by $$f_{Lap}(x) = \frac{\Lambda}{2} \cdot e^{-\Lambda \cdot |x|} \quad (14)$$

which has a single parameter $\Lambda$. It may then be possible to derive a relationship between optimal Lagrange parameter $\lambda_{opt}$ as a function of $Q_s$ and $\Lambda$:

$$\lambda_{opt} = f(\Lambda \cdot Q_s) \quad (15)$$

In one embodiment of the present invention, such a function may be employed as a lookup table in practical video coders.

Figure 5:
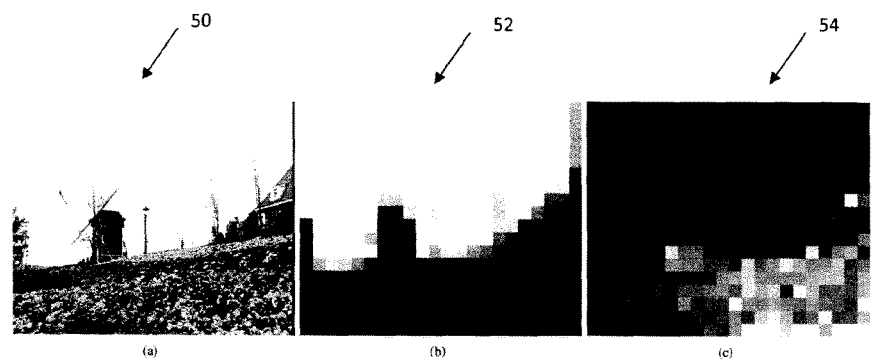
FIG. 5 is a graph illustrating a visual example of computed divisive normalization factors for different macroblocks in a video frame.

Now referring to FIG. 5, shown is a graph that illustrates a visual example of computed divisive normalization factors in accordance with an embodiment of the present invention for different macroblocks in a video frame. (a) shows the original frame 50; (b) shows the divisive normalization factors computed for the DC coefficients for the macroblocks across space 52; (c) shows the divisive normalization factors computed for AC coefficients for the macroblocks across space 54. The prior art video coding methods do not have such a normalization process and thus corresponds the case that all the normalization factors are constant. The spatially varying divisive normalization factor in the present invention leads to redistribution of the available bandwidth to improve the final coding results in terms of SSIM measurement.

Figure 6:
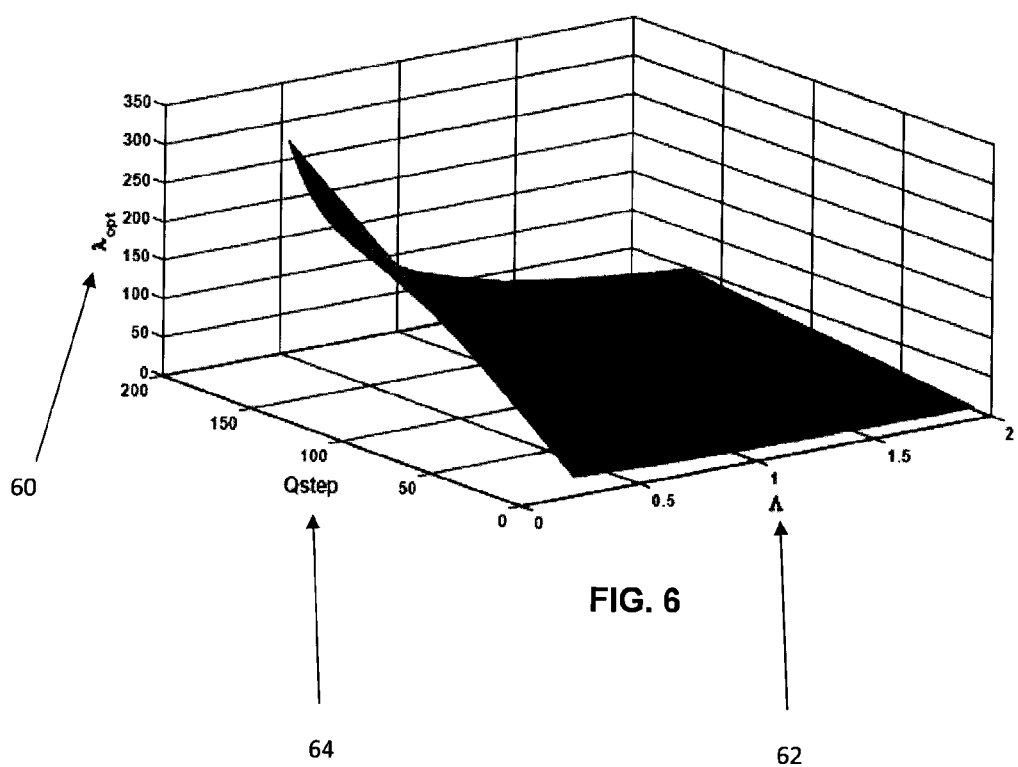
FIG. 6 is a graph illustrating the optimal Lagrange parameter λ as a function of the Laplacian distribution parameter A and the quantization Qstep in an embodiment of the present invention.
Figure 7A:
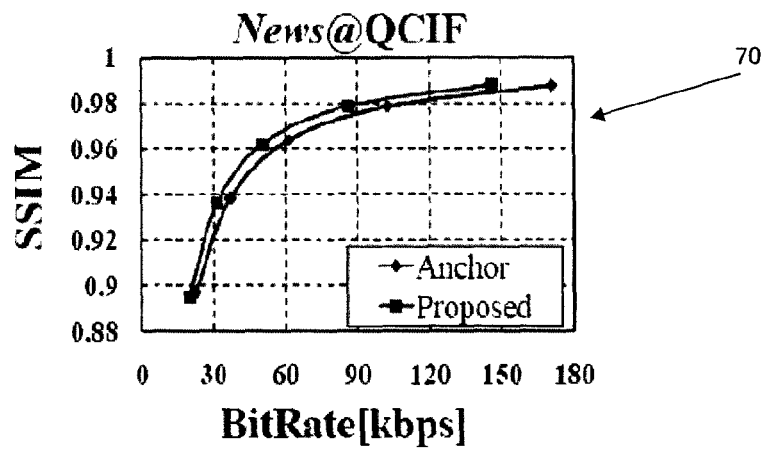
FIG. 7a is a graph illustrating the rate-SSIM (structural similarity) performance comparisons between the present invention and a prior art MPEG4/H.264 AVC coding scheme for a standard test video sequence News@QCIF.
Figure 7B:
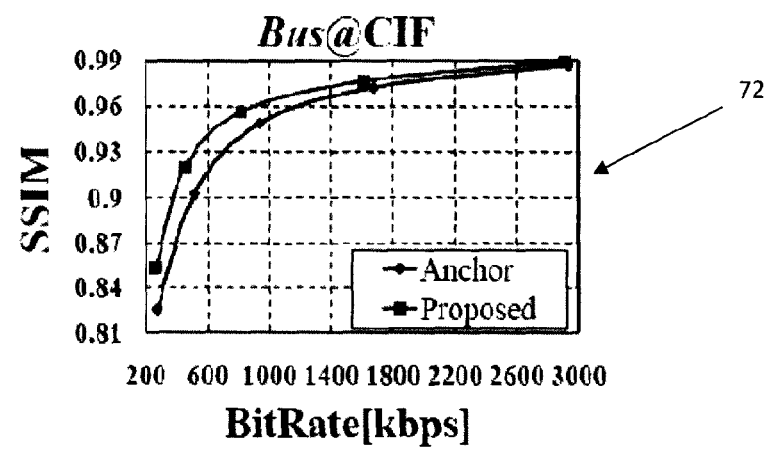
FIG. 7b is a graph illustrating the rate-SSIM performance comparisons between the present invention and a prior art MPEG4/H.264 AVC coding scheme for a standard test video sequence Bus@CIF.
Figure 7C:
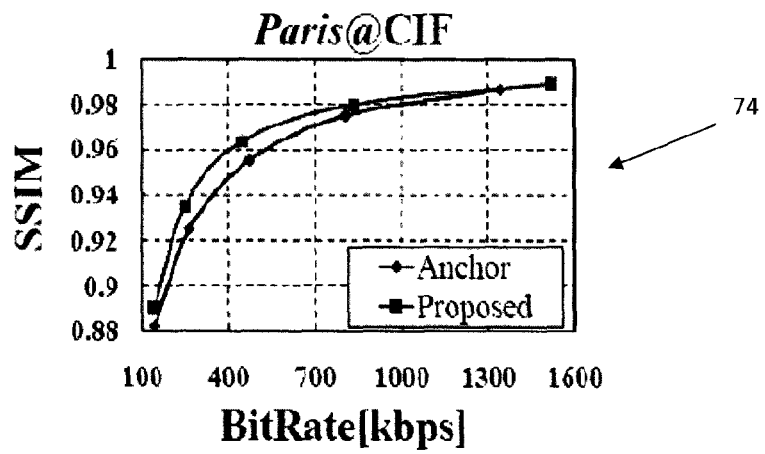
FIG. 7c is a graph illustrating the rate-SSIM performance comparisons between the present invention and a prior art MPEG4/H.264 AVC coding scheme for a standard test video sequence Paris@CIF.
Figure 7D:
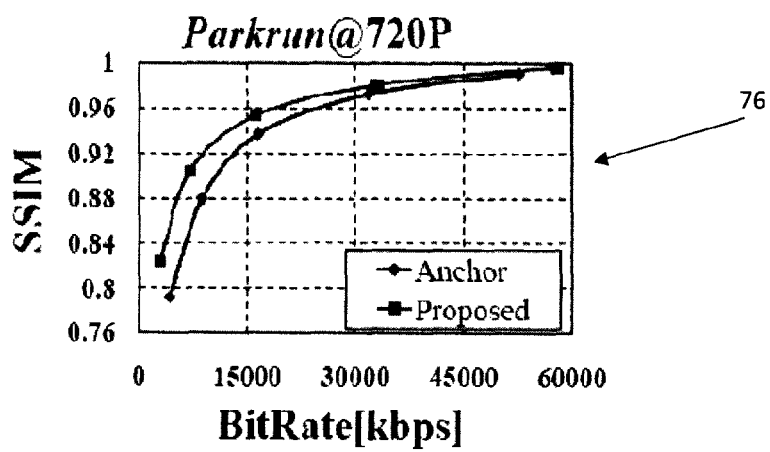
FIG. 7d is a graph illustrating the rate-SSIM performance comparisons between the present invention and a prior art MPEG4/H.264 AVC coding scheme for a standard test video sequence Parkrun@720p.

FIG. 6 is a graph illustrating the optimal Lagrange parameter $\lambda$ 60 as a function of the Laplacian distribution parameter $\Lambda$ 62 and the quantization Qstep 64 in accordance with an embodiment. This relationship may be utilized by the present invention to predict the optimal Lagrange parameter $\lambda$ by a lookup table. The Laplacian distribution parameter $\Lambda$ and the quantization Qstep may be utilized as input arguments.

Since DCT is an orthogonal transform that obeys Parseval's theorem, the result may be $$\mu_x = \frac{\sum_{i=0}^{N-1} x(i)}{N} = \frac{X(0)}{\sqrt{N}} \quad (16)$$

$$\sigma_x^2 = \frac{\sum_{i=1}^{N-1} X(i)^2}{N-1}$$

$$\sigma_{xy} = \frac{\sum_{i=1}^{N-1} X(i)Y(i)}{N-1}$$

Therefore, although methods and other calculations of the present invention may be derived in DCT domain, in some other embodiments of the present invention, it may not be necessary to perform actual DCT transform for each block in order to perform normalization, but carry out the computation in the pixel domain.

The frame-level quantization matrix and divisive normalization may be combined to a single quantization matrix, for example, in 4×4 DCT case $$WS_{ij} = 16 \cdot \begin{bmatrix} f_{dc}' \cdot \omega_{0,0} & f_{ac}' \cdot \omega_{0,1} & f_{ac}' \cdot \omega_{0,2} & f_{ac}' \cdot \omega_{0,3} \\ f_{ac}' \cdot \omega_{1,0} & f_{ac}' \cdot \omega_{1,1} & f_{ac}' \cdot \omega_{1,2} & f_{ac}' \cdot \omega_{1,3} \\ f_{ac}' \cdot \omega_{2,0} & f_{ac}' \cdot \omega_{2,1} & f_{ac}' \cdot \omega_{2,2} & f_{ac}' \cdot \omega_{2,3} \\ f_{ac}' \cdot \omega_{3,0} & f_{ac}' \cdot \omega_{3,1} & f_{ac}' \cdot \omega_{3,2} & f_{ac}' \cdot \omega_{3,3} \end{bmatrix} \quad (17)$$

with the added factors $\omega_{i,j}$ for i=1, 2, 3, 4 and j=1, 2, 3, 4. The Laplace parameters and the expectation of the energy should be available before coding the current frame. However, their precise quantities may only be obtained after coding it. As they can be reasonably regarded as constants during a short time when there is no scene change, in one embodiment of the present invention, they may be estimated by averaging their three previous values from the frames coded in the same matter:

$$\hat{\Lambda}_{i,j}^{s} = \frac{1}{3}\sum_{n=1}^{3}\Lambda_{i,j}^{s-n} \qquad (18)$$

The following describe one aspect of the present invention when it is used to improve HEVC. The HEVC codec uses a square-shaped coding tree block (CTB) as a basic unit that may have various sizes, with no distinction corresponding to its size. All processing except frame-based loop filtering is performed on a CTB basis, including intra/inter prediction, transform, quantization and entropy coding. In HEVC, coupled with CTB, a basic unit for the prediction mode is the prediction unit (PU), which may be of various sizes and is not necessarily rectangular. In addition to the CTB and PU definitions, the transform unit (TU) for transform and quantization is defined separately in HEVC. The size of TU may be as large as the size of the CTB. In an embodiment, TU are constrained to the range 4×4 to 64×64. The three major frame types used are: intra-coded frame or I frame (that uses no prediction from other frames to encode and decode); predicted frame or P frame (that uses prediction from past frames to encode and decode); and bi-predictive frame or B frame (that uses predictions from both past and future frames to encode and decode).

In an illustrative embodiment of the present invention, the coding scheme is completely compatible with any frame type supported by HEVC, as well as any size or shape choices of CTB, PU and TU, which may create significant complications as opposed to the macroblock (MB) structure defined in previous video coding standards such as MPEG4/H.264 AVC. First, the local expected values of local divisive normalization factors (the denominator in (6) and (7)) are obtained by dividing the predicted current frame into 4×4 blocks (the greatest common divisor size for CTB, PU and TU) and then averaged over the whole frame. This avoids the problem of variable sizes of TU that create an uneven number of DCT coefficients, and thus causes difficulty in estimating the expected values of the divisive normalization factor. Second, the divisive normalization factor for each 4×4 block is computed in the pixel domain rather than the DCT transform domain. However, they are indeed equivalent due to the variance preserving property of the DCT transform. This avoids the computation of DCT for every 4×4 block. Third, the divisive normalization factor is spatially adaptive but coincides with an individual TU. In other words, every TU is associated with a single set of divisive normalization factors but different from other TUs. The normalization matrix in Eq. (10) is thus variable based on the size of TU. However, only two divisive normalization factors are used, one for the DC coefficient and the other for all AC coefficients. Since each TU may contain multiple 4×4 blocks, the divisive normalization factor for each TU is estimated by averaging the divisive normalization factors computed for all 4×4 blocks contained in the TU.

Examples of Implementations and Results

Implementation trials and tests have shown that the present invention can achieve approximately 21% to 63% rate reduction with an average of approximately 35% rate reduction for HD 720p sequences, and 6% to 42% rate reduction with an average of approximately 15% rate reduction for lower resolution sequences, as compared to prior art uses of an MPEG/H.264 AVC JM15.1 coder. The present invention may include a quantization step, as described herein, that a MPEG/H.264 AVC JM15.1 prior art encoder does not apply. Specifically, in the tests the common coding configurations were set as follows: only 4×4 DCT transform is enabled; all available inter and intra modes are enabled; five reference frames; one I frame followed by 99 P frames; high complexity RDO and the fixed quantization parameters (QP). The rate reduction results were found to be stable for both high bit-rate ($QP_1$={18, 22, 26, 30}) and low bit-rate ($QP_2$={26, 30, 34, 38}) video coding.

The rate reduction of the present invention may be achieved while maintaining the same level of perceptual video quality as prior art uses of a MPEG/H.264 AVC JM15.1 encoder. The level of perceptual video quality of the present invention has been verified by both objective SSIM quality measure and subjective experiments. For YCbCr color video, the SSIM value is computed using the luminance component Y only, and the weighted SSIM value, denoted as $SSIM_w$, is computed using a weighted sum of three color components given by $$SSIM_w = W_Y \cdot SSIM_Y + W_{Cb} \cdot SSIM_{Cb} + W_{Cr} \cdot SSIM_{Cr}. \qquad (19)$$

where the weights are $W_Y=0.8$ and $W_{Cb}=W_{Cr}=0.1$, respectively.

The rate reduction achieved by the present invention may depend on the nature of the video signal being coded. The variations can be seen in the figures.

FIGS. 7(a)-7(d) show graphs of test results illustrating the rate-SSIM performance comparisons between an embodiment of the present invention and a prior art MPEG4/H.264AVC coding scheme. The four standard test video sequences include News in QCIF format 70, Bus in CIF format 72, Paris in CIF format 74 and Parkrun in 720p format 76. The horizontal axis in each graph is the bit rate in units of kbps, and SSIM values of the decoded video sequences are along the vertical axis. The curves having circles embedded therein represent results obtained by the prior art MPEG4/H.264 AVC coding method in each graph. The curves having squares embedded therein represent results obtained by an embodiment of the present invention in each graph. The present invention achieves better SSIM values for the same bit rate as compared to the prior art method in each of the graphs. Moreover, the present invention achieves a lower bit rate at the same SSIM level as compared to the prior art method in each of the graphs.

For example, as shown in FIG. 5, the rate-SSIM performance of the frame coding method of the present invention may provide improved visual quality of frames as compared to the results achieved by applying a prior art coding scheme. FIG. 5 includes: the original frame as example (a) 50; an H.264 coded frame as example (b) 52 that shows the divisive normalization factors computed for the DC coefficients for the macroblocks across space; and an H.264 coded frame with the proposed RDO method as example (c) 54 that shows the divisive normalization factors computed for AC coefficients for the macroblocks across space. Prior art video coding methods do not include a normalization process such as that of the present invention. Instead in prior art video coding methods all normalization factors are constant. The spatially varying divisive normalization factor of the present invention may lead to redistribution of the available bandwidth to improve the SSIM measurement of final coding results.

Figure 8A:
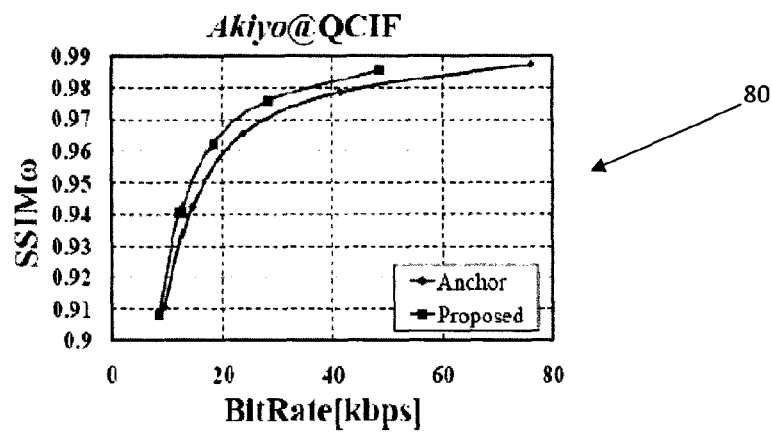
FIG. 8a is a graph illustrating a rate-$SSIM_W$ performance comparison between an MPEG4/H.264 AVC coding scheme and the present invention for a standard test video sequence Akiyo@QCIF.
Figure 8B:
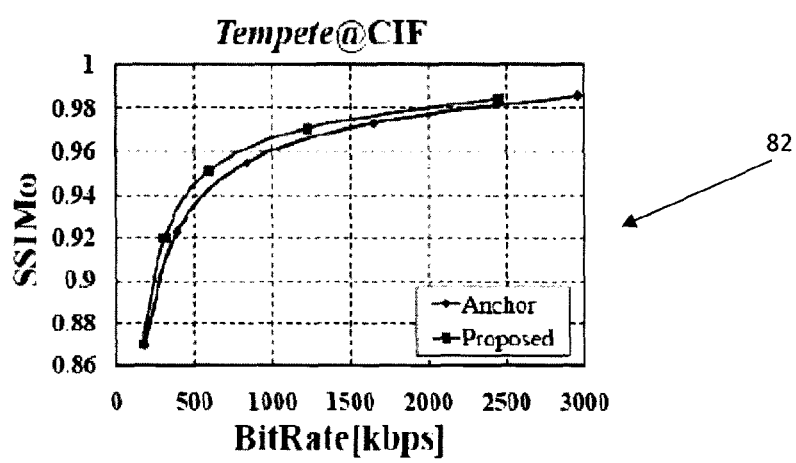
FIG. 8b is a graph illustrating a rate-$SSIM_W$ performance comparison between an MPEG4/H.264 AVC coding scheme and the present invention for a standard test video sequence Tempete@CIF.
Figure 8C:
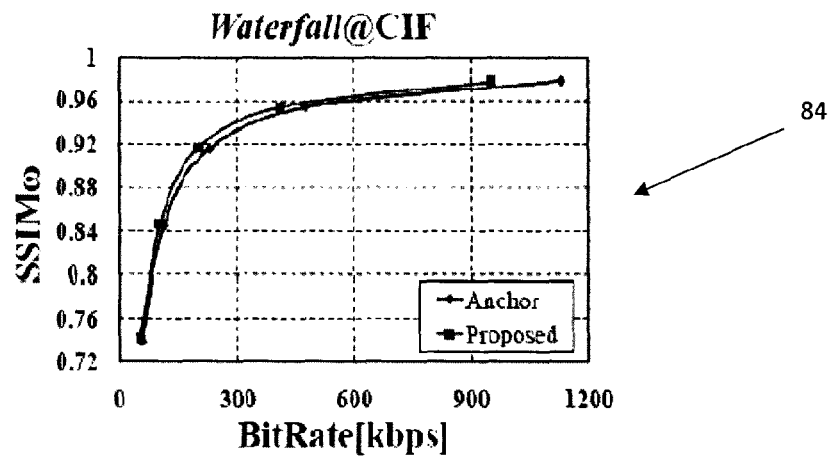
FIG. 8c is a graph illustrating a rate-$SSIM_W$ performance comparison between an MPEG4/H.264 AVC coding scheme and the present invention for a standard test video sequence Waterfall@CIF.
Figure 8D:
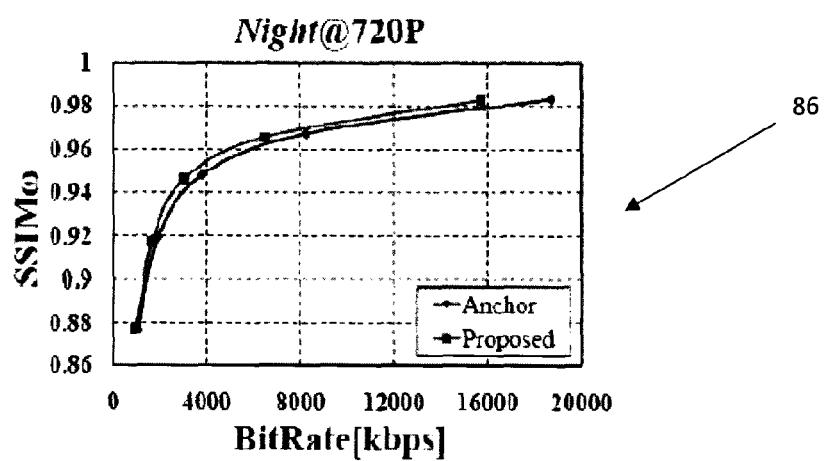
FIG. 8d is a graph illustrating a rate-$SSIM_w$ performance comparison between an MPEG4/H.264 AVC coding scheme and the present invention for a standard test video sequence Night@720p.

FIGS. 8(a)-8(d) are graphs illustrating the rate-SSIM, performance comparisons between an embodiment of the present invention and an MPEG4/H.264 AVC coding scheme. The four sub-drawings show the test results of four standard test video sequences, which are "Akiyo" in QCIF format, "Tempete" in CIF format, "Waterfall" in CIF format, and "Night" in 720p format, respectively. More specifically, FIG. 8a shows a graph 80 of the results of a test the standard test video sequence Akiyo in QCIF format. FIG. 8b shows a graph 82 of the results of a test the standard test video sequence Tempete in CIF format. FIG. 8c shows a graph 84 of the results of a test the standard test video sequence Waterfall in CIF format. FIG. 8d shows a graph 86 of the results of a test the standard test video sequence Night in 720p format.

In each of the graphs of FIGS. 8a-8d the horizontal axis is the rate bit in units of kbps, and the vertical axis is that $SSIM_W$ values of the decoded video sequences. The curves in the graphs 80, 82, 84, 86 having a circle embedded therein reflect the results obtained by the prior art MPEG4/H.264 AVC coding method. The curves in the graphs 80, 82, 84, 86 having a square embedded therein reflect the results achieved by an embodiment of the present invention. When the video coding method of an embodiment of the present invention and the prior art MPEG4/H.264 AVC video coding method are compared, the embodiment of the present invention achieved better $SSIM_W$ values for the same bit rate, as reflected in graphs 80, 82, 84, 86. The graphs 80, 82, 84, 86 further reflect that at the same $SSIM_W$ level an embodiment of the present invention achieves a lower bit rate than the prior art MPEG4/H.264 AVC video coding method.

Figure 9:
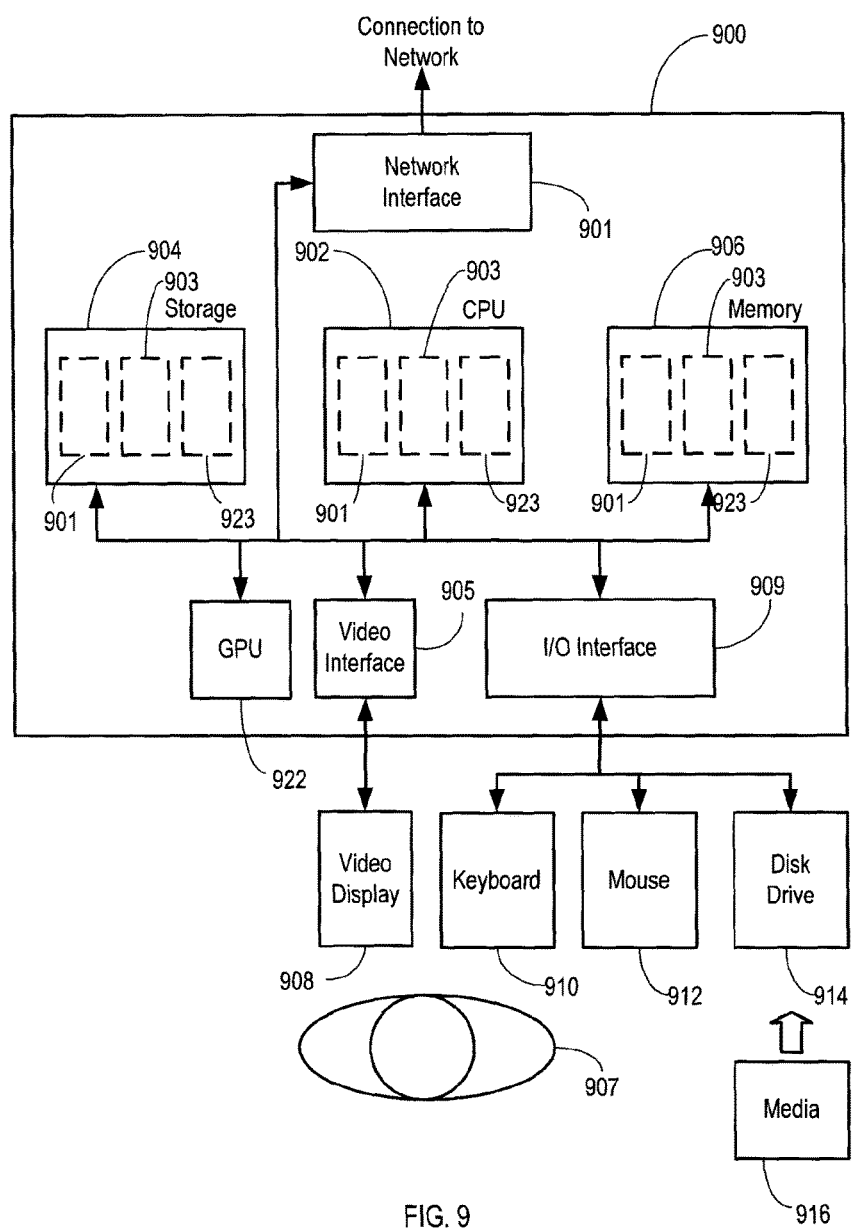
FIG. 9 is a generic computer device that may provide a suitable operating environment for practising various embodiments of the invention.

The systems and methods in accordance with the present invention may be practiced in various embodiments. A suitably configured computer device, and associated communications networks, devices, software and firmware may provide a platform for enabling one or more embodiments as described above. By way of example, FIG. 9 shows a generic computer device 900 that may include a central processing unit ("CPU") 902 connected to a storage unit 904 and to a random access memory 906. The CPU 902 may process an operating system 901, application program 903, and data 923. The operating system 901, application program 903, and data 923 may be stored in storage unit 904 and loaded into memory 906, as may be required. Computer device 900 may further include a graphics processing unit (GPU) 922 which is operatively connected to CPU 902 and to memory 906 to offload intensive image processing calculations from CPU 902 and run these calculations in parallel with CPU 902. An operator 907 may interact with the computer device 900 using a video display 908 connected by a video interface 905, and various input/output devices such as a keyboard 910, mouse 912, and disk drive or solid state drive 914 connected by an I/O interface 909. In known manner, the mouse 912 may be configured to control movement of a cursor in the video display 908, and to operate various graphical user interface (GUI) controls appearing in the video display 908 with a mouse button. The disk drive or solid state drive 914 may be configured to accept computer readable media 916. The computer device 900 may form part of a network via a network interface 911, allowing the computer device 900 to communicate with other suitably configured data processing systems (not shown).

The systems and methods in accordance with various embodiments of the present invention may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

Illustrative Results

TABLE A, below, compares rate-SSIM and rate-$SSIM_w$ performances of an embodiment of the present invention with an MPEG4/H.264 AVC coding scheme.

TABLE A

| Sequence | $QP_1$ = {18, 22, 26, 30} | | | | $QP_2$ = {26, 30, 34, 38} | | | |
| --- | --- | --- | --- | --- | --- | --- | --- | --- |
| | ΔSSIM | ΔR | $ΔSSIM_w$ | $ΔR_w$ | ΔSSIM | ΔR | $ΔSSIM_w$ | $ΔR_w$ |
| Akiyo(QCIF) | 0.0037 | −19.89% | 0.0043 | −22.49% | 0.0080 | −12.67% | 0.0075 | −13.24% |
| Bridge-close(QCIF) | 0.0066 | −32.87% | 0.0069 | −28.13% | 0.0281 | −41.51% | 0.0234 | −41.55% |
| Carphone(QCIF) | 0.0022 | −13.01% | 0.0027 | −14.04% | 0.0039 | −8.12% | 0.0040 | −8.67% |
| Coastguard(QCIF) | 0.0034 | −6.97% | 0.0027 | −6.57% | 0.0094 | −9.11% | 0.0074 | −8.83% |
| Container(QCIF) | 0.0022 | −9.70% | 0.0005 | −3.07% | 0.0042 | −11.05% | 0.0031 | −9.63% |
| Grandma(QCIF) | 0.0062 | −19.68% | 0.0065 | −21.11% | 0.0117 | −13.26% | 0.0107 | −13.60% |
| News(QCIF) | 0.0033 | −15.50% | 0.0034 | −14.91% | 0.0075 | −12.74% | 0.0074 | −12.86% |
| Salesman(QCIF) | 0.0040 | −12.27% | 0.0049 | −14.04% | 0.0125 | −11.37% | 0.0118 | −11.93% |
| Akiyo(CIF) | 0.0029 | −20.39% | 0.0032 | −23.29% | 0.0041 | −11.93% | 0.0040 | −12.90% |
| Bus(CIF) | 0.0048 | −17.27% | 0.0040 | −14.56% | 0.0208 | −23.95% | 0.0172 | −23.32% |
| Coastguard(CIF) | 0.0033 | −7.32% | 0.0027 | −7.29% | 0.0118 | −11.56% | 0.0095 | −11.47% |
| Flower(CIF) | 0.0036 | −23.20% | 0.0052 | −24.69% | 0.0092 | −19.21% | 0.0110 | −21.98% |
| Mobile(CIF) | 0.0014 | −9.12% | 0.0020 | −9.68% | 0.0055 | −13.88% | 0.0057 | −13.66% |
| Paris(CIF) | 0.0036 | −15.00% | 0.0025 | −10.10% | 0.0109 | −17.85% | 0.0091 | −15.80% |
| Tempete(CIF) | 0.0023 | −13.34% | 0.0035 | −16.11% | 0.0083 | −14.66% | 0.0085 | −15.31% |
| Waterfall(CIF) | 0.0038 | −13.04% | 0.0042 | −12.69% | 0.0130 | −10.33% | 0.0116 | −10.30% |
| BigShip(720P) | 0.0040 | −11.98% | 0.0036 | −12.20% | 0.0051 | −7.21% | 0.0044 | −7.39% |
| Night(720P) | 0.0031 | −13.17% | 0.0031 | −14.07% | 0.0064 | −11.42% | 0.0059 | −11.83% |
| Spincalendar(720P) | 0.0046 | −20.03% | 0.0024 | −11.60% | 0.0035 | −14.03% | 0.0017 | −9.22% |
| Parkrun(720P) | 0.0072 | −5.95% | 0.0054 | −12.57% | 0.0319 | −36.18% | 0.0259 | −35.30% |
| Average | 0.0038 | −14.99% | 0.0037 | −14.66% | 0.0108 | −15.6% | 0.0095 | −15.44% |

In TABLE A the left column includes standard test video sequences. Tests were conducted utilizing the standard test video sequences in the left column of the TABLE A, where QP1 and QP2 indicate high bit rate and low bit rate coding configurations. In TABLE A the four columns to the right of the far left column include results for high bit rate (QP1)

tests, whereas the four columns from the left side of the table include results for low bit rate (QP2) tests. Four results were reported for each of the high bit rates tests for high bit rate (QP1) and low bit rate (QP2), including the following: (i) the improvement of a SSIM value for a fixed bit rate; (ii) the bit rate change (in percentage) for fixed SSIM value; (iii) the improvement of a $SSIM_W$ value for a fixed bit rate; and (iv) the bit rate change (in percentage) for a fixed $SSIM_W$ value. Each of these four results are shown in the four columns for each of high bit rate (QP1) and low bit rate (QP2) in order from left to right respectively. As shown in TABLE A, an embodiment of the present invention may outperform a prior art MPEG4/H.264 AVC coding scheme. The average improvement, based on the results shown in TABLE A, of the bit rate reduction is about 15%. This average improvement may be achieved by an embodiment of the present invention over the prior art MPEG4/H.264 AVC coding scheme without sacrificing SSIM or $SSIM_W$ performance. A skilled reader will recognize that the average improvement is provided merely as one example of the possible average improvement that may be achieved by an embodiment of the present invention over prior art coding schemes, and that other average improvements may be achieved based on other tests, including average improvements that are reflect better results by the present invention compared to prior art coding schemes.

Table B, below, compares encoder and decoder computational complexities achieved by the present invention to those achieved by an MPEG4/H.264 AVC coding scheme.

TABLE B

| Sequences | ΔT in Encoder | ΔT in Decoder |
| --- | --- | --- |
| Akiyo(QCIF) | 1.20% | 8.97% |
| News(QCIF) | 1.17% | 11.30% |
| Mobile(QCIF) | 1.34% | 5.3% |
| Bus(CIF) | 1.16% | 9.16% |
| Flower(CIF) | 1.11% | 8.75% |
| Tempete(CIF) | 0.96% | 7.38% |
| Average | 1.16% | 8.48% |

The test was conducted for 6 standard test video sequences, which are Akiyo at QCIF format, News at QCIF format, Mobile at QCIF format, Bus at CIF format, Flower at CIF format, and Tempete at CIF format. The computational time increases of the video codec of the embodiment of the present invention in the test were reported for both encoder and decoder, as were the computational time increases for the video codec of the prior art MPEG4/H.264 AVC. The average time increases based on all of the test video sequences of the encoder are shown in the middle column of the TABLE B. The average increases of computational time are reflected as about 1% at the encoder. The average time increases based on all of the test video sequences of the decoder are shown in the far right column of the table 100. The average increases of computational time are reflected as about 8% at the decoder. The average increases of computational time may be a useful indicator of computational complexity.

TABLE C, below compares rate-SSIM performances of the present invention to an MPEG2/H.264 AVC coding scheme for High Definition (HD) video sequences.

TABLE C

| Sequence | ΔR |
| --- | --- |
| Buildings | −28.5% |
| Mountains | −37.4% |

TABLE C-continued

| Sequence | ΔR |
| --- | --- |
| Oak | −23.0% |
| Peaks | −62.9% |
| Revolving Stand | −21.7% |
| Trees | −42.0% |
| Water Stream | −33.2% |
| Woods | −32.8% |
| Average | −35.2% |

As shown in TABLE C, rate-SSIM performances of an embodiment of the present invention with an MPEG4/H.264 AVC coding scheme for HD video sequences with 720p resolution (1280×720). The bit rate changes (in percentage) for fixed SSIM values are reported. In all cases, the present invention outperforms prior art MPEG4/H.264 AVC coding scheme, and the average improvement in terms of bit rate reduction (without sacrificing SSIM performance) is about 35%.

Implementation trials and tests have also shown that the present invention can achieve significant data rate reduction, as compared to prior art uses of the HEVC HM 3.0 encoder with default configurations.

TABLE D, below, compares rate-SSIM performance of the present invention to an HEVC coding scheme.

TABLE D

| Sequence | Resolution | Δ R | Ave. ΔR |
| --- | --- | --- | --- |
| Kimono | 1920 × 1080 | −4.0% | −12.7% |
| ParkScene | | −10.0% | |
| Cactus | | −13.2% | |
| BasketballDrive | | −13.7% | |
| BQTerrace | | −22.6% | |
| Vidyo1 | 1280 × 720 | −7.6% | −9.16% |
| Vidyo3 | | −16.9% | |
| Vidyo4 | | −3.0% | |
| BasketballDrill | 832 × 480 | −12.3% | −10.58% |
| BQMall | | −8.8% | |
| PartyScene | | −12.2% | |
| RaceHorses | | −9.0% | |
| BasketballPass | 416 × 240 | −9.2% | −13.95% |
| BQSquare | | −32.1% | |
| BlowingBubbles | | −8.5% | |
| RaceHorses | | −6.0% | |
| Average | | −11.82% | |

In TABLE D, the left column includes standard test video sequences. The middle column gives the format of the video sequences, which are either WQVGA (resolution 432×240), WVGA (resolution 800×480), 720p (resolution 1280×720) or 1080p (resolution 1920×1080). The right column shows the bit rate change (in percentage) while maintaining the same SSIM value. Thus, an embodiment of the present system and method outperforms a prior art HEVC HM 3.0. The performance gain varies significantly for different video sequences. It could be as high as 32.1% bit rate reduction to as low as 3.0% rate reduction. The average improvement in terms of the bit rate, based on the results shown, is 11.82%. This improvement may be achieved by an embodiment of the present system and method over the prior art HEVC HM 3.0 coding scheme without sacrificing SSIM performance. A skilled reader will recognize that the average improvement is provided merely as one illustrative example of the possible improvements that may be achieved by the present system and method over prior art HEVC coding scheme, and that greater or lesser improvements may be achieved based on other tests.

The computational complexity overhead on top of MPEG4/H.264 AVC JM15.1 may also vary with the nature of the video content, but the deviations between different video may be minor. The average increase of the computational complexity has been shown to be approximately 1% at the encoder and 8% at the decoder by the present invention, as described herein.

TABLE E compares encoder and decoder computational complexities achieved by the present invention to those achieved by an HEVC coding scheme.

TABLE E

|  | ΔT |
| --- | --- |
| Encoder | 0.8% |
| Decoder | 2.1% |

In the present illustrative example, the increased computational cost was approximately 0.8% at the encoder, and 2.1% at the decoder. A skilled reader will recognize that this computational complexity estimate is provided merely as one example of the possible complexity change by an embodiment of the present invention over prior art HEVC coding scheme, and that other estimates of greater or letter computational complexity may be obtained based on other tests.

The inventors have found that the present invention can, on average, substantially improve the rate-distortion performance of video coding schemes such as MPEG4/H.264 AVC and HEVC. However, the performance improvement can vary significantly, depending on the content of the video frame being encoded. In general, video frames that have large variations in terms of the texture content often exhibit a greater performance gain. Thus, the present system and method may adjust the divisive normalization factors based on the local content of the video frame. The content may be characterized by a local computed complexity measure, such as local contrast, local energy or local signal activities. In an illustrative embodiment, the local complexity is characterized by the standard deviation of each local 4×4 block. After the standard deviation of all local 4×4 blocks in a frame is computed, a histogram may be created to examine the distribution of the standard deviation values. In an illustrative embodiment, the normalization factors of the local blocks that have very large or very small standard deviations are limited to a maximum and minimum normalization factor value, respectively. The inventor has found that such content-based adjustment of divisive normalization factors is helpful in improving the robustness of the performance gain achieved by the present system and method.

The examples described herein are provided merely to exemplify possible embodiments of the present invention. A skilled reader will recognize that other embodiments of the present invention are also possible.

It will be appreciated by those skilled in the art that other variations of the embodiments described herein may also be practiced without departing from the scope of the invention. Other modifications are therefore possible. For example, the embodiments of the present invention may be utilized by scalable video coding, 3D TV, medical imaging, and telemedicine devices, as well as service providers for any of these technologies.

Examples of Application Scenarios

The present invention may generally be utilized for the storage and transmission of digital video signals. It may be implemented on both software and hardware platforms.

One embodiment of the present invention may be a video coding system, as shown in FIG. 2 that incorporates a frame capture component 18. The frame capture component may be operable to process current or historical frames in accordance with the method of the present invention disclosed herein. Historical frame, or results pertaining to historical frames, which may be prior frames or historical frame results may be obtained by the frame capture component. The one or more historical frames, or one or more historical frame results, may be obtained by the frame capture component in that the component retains such information once it has coded a historical frame as a prior frame. One or more historical frames and/or frame results may alternatively be accessed by, or otherwise transferred to, the frame capture component from a prior frame results repository 20.

As shown in FIG. 2, the prior frame results repository may be separate from the frame capture component. The prior frame results repository may even be remotely located from the frame capture component. A connection, or any other type of link, may exist between the frame capture component and the prior frame results repository. The connection or link may be of various types, such as, for example a wireless link, a wired link, or other type of connections or links. The connection or link may be direct between the frame capture component and the prior frame results repository, or may be via a connection facilitator, such as, for example the Internet, a cloud, or any other type of connection facilitator. The connection or link may be operable to allow for the transfer of information between the frame capture component and the prior frame results repository. For example, the frame capture component may receive information from the prior frame results repository, the information may be one or more prior frames, or one or more prior frame results. The frame capture component may further send information to the prior frame results repository, such as one or more prior frames, or one or more prior frame results. The prior frame results repository may be connected to data storage means, such as a database located on a remote or local server, or the prior frame results repository may be capable of storing transferred information therein. The prior frame results repository may receive information from outside sources, including remote sources, and may be linked to such sources in a variety of manners, for example, such as by any of the types of links and connections described herein as possible links or connections between the prior frame results repository and the frame capture component.

The frame capture component may receive information representing one or more frames. Said one or more frames may be provided to the frame capture component in a variety of manners. As one possible means of transfer of information, a frame repository 22, as shown in FIG. 2 may be connected or otherwise linked to the frame capture component. One or more frames may be provided to the frame capture component from the frame repository. Frames, being current frames, may be provided to the frame capture component in a variety of other methods as well, such as, for example by direct provision of video feed, or other feed of frames, to the frame capture component.

As shown in FIG. 2, the frame repository 22 may be separate from the frame capture component. The frame repository may even be remotely located from the frame capture component. A connection, or any other type of link, may exist between the frame capture component and the frame repository. The connection or link may be of various types, such as, for example a wireless link, a wired link, or other type of connections or links. The connection or link may be direct between the frame capture component and the frame repository, or may be via a connection facilitator, such as, for example the Internet, a cloud, or any other type of connection facilitator. The connection or link may be operable to allow for the transfer of information between the frame capture component and the frame repository. The frame capture component may receive information from the frame repository, the information may be one or more frames. The frame repository may be connected to a data storage means, such as a database located on a remote or local server, or the frame repository may be capable of storing transferred information therein. The frame repository may receive information from outside sources, including remote sources, and may be linked to such sources in a variety of manners, for example, such as by any of the types of links and connections described herein as possible links or connections between the frame repository and the frame capture component.

The frame capture component may receive or otherwise capture one or more frames, and may further receive, or otherwise obtain, one or more prior frames, or one or more prior frame results, corresponding to the one or more frames. The frame capture component may be linked to, or incorporate, a perceptual coding component. As shown in FIG. 2, the perceptual coding component 16 may be separate, but linked to, the frame capture component 18. A skilled reader will recognize that the perceptual coding component may alternately be integrated in the frame capture component, or the perceptual coding component may be connected to, or linked to, the frame capture component in a variety of manners in embodiments of the present invention.

The perceptual coding component may be operable to code the one or more frames received by the frame capture component, in a manner described herein. The perceptual coding component may be operable to apply the SSIM-based divisive normalization approach of the present invention. In its operation the perceptual coding component may utilize the one or more prior frames, or one or more prior frame results, corresponding to the one or more frames received or otherwise obtained or captured by the frame capture component. The one or more frames and corresponding one or more prior frames and/or one or more prior frame results may be transferred, or otherwise provided to, the perceptual coding component by the frame capture component. The perceptual coding component may code the one or more frames and corresponding one or more prior frames and/or one or more prior frame results in a manner described herein, to produce results that may be utilized to improve the perceptual quality of decoded video without increasing data rate, or to reduce the data rate of compressed video stream without sacrificing perceived quality of the decoded video.

The frame capture component may be a coder, including a coder having a perceptual coding component connected thereto, or incorporated therein. The frame capture component, and any components linked thereto, may further be incorporated or connected to a coder device, or any computer system. In this manner, the system of the present invention may be incorporated in, or linked to, other systems. Such connected systems may be utilized to provide information, such as any results of the present invention, to one or more users. For example, the connected systems may include output means, such as a display screen. The connected systems may further be operable to transfer information to the present invention system, for example, such as to transfer one or more frames or one or more prior frames, or prior frame results, to the present invention or any component of the present invention system. A skilled reader will recognize the variety of ways that the present invention system and any of its components may be integrated with, or connected to, other systems.

A skilled reader will recognize that the present invention may be applied in various digital video applications. For example, the present invention may be utilized by manufacturers and service providers of smartphone, videoconferencing, HDTV™, IPTV™, Web TV™, network video-on-demand, DVD, digital cinema, etc. technologies and devices. For example, smartphone companies, such as RIM™, Apple™, Samsung™, HTC™, Huawei™, or other smartphone companies, may utilize the present invention to improve video transmission to smartphones, including between smartphone users. The present invention may be utilized to develop videoconferencing applications wherein the bandwidth cost could be significantly reduced without losing perceived video quality; or the video quality could be significantly improved with the same bandwidth cost. As another example, network video providers, such as Youtube™, or other network video providers, may utilize the present invention to improve the quality of the video being delivered to consumers; and/or to reduce the traffic of their network servers. As yet another example, current video quality of HDTV is often impaired by current commercial compression systems when the bandwidth is limited (especially when the video contains significant motion), and thus HDTV service providers may improve the HD video quality delivered to their customers by adopting the present invention. As yet another example, digital cinema technology companies, such as IMAX™, may use the present invention to improve the quality of the high resolution digital movie video content or to reduce the traffic burden of digital cinema network (wired or wireless) services.

Network video service providers who require video transcoding, that converts digital video from one format to another, may also make use of the present invention. When a video signal is received, it may be re-encoded by the present invention to deliver better visual quality. The present invention may be implemented as a network component, or may be embodied in a network component with other functions in order to apply the video coding function described herein.

An embodiment of the present invention that incorporates a software package, such as, for example a computer program product, may be operable to allow consumers to burn more digital content with the same storage space on their computer hard drives, DVDs, flash drives, and other portable and/or importable storage devices.

Another embodiment of the present invention may be extended to scalable video coding framework where the divisive normalization factors may be determined from base or lower quality layers to higher quality layers.

Additionally, the present invention may be directly extended to 3D video for the purposes of stereo and multi-view video compression, as well as 3D volume data compression.

While illustrative embodiments of the invention have been described above, it will be appreciated that various changes and modifications may be made without departing from the scope of the invention as defined by the claims.

REFERENCES

Background prior art references include:
[1] G. J. Sullivan and T. Wiegand, "Rate-distortion optimization for video compression," IEEE Signal Processing Magazine, vol. 15, pp. 74-90, November 1998.
[2] Z. Wang, A. C. Bovik, H. R. Sheikh, and E. P. Simoncelli, "Image quality assessment: From error visibility to structural similarity," IEEE Trans. on Image Processing, vol. 13, pp. 600-612, April 2004.
[3] B. Aswathappa and K. R. Rao, "Rate-distortion optimization using structural information in H.264 strictly intra-frame encoder," South Eastern Symposium on System Theory, pp. 367-370, 2010.
[4] Z. Mai, C. Yang, L. Po, and S. Xie, "A new rate-distortion optimization using structural information in H.264 I-frame encoder," Proc. ACIVS, pp. 435-441, 2005.

[5] Z. Mai, C. Yang, and S. Xie, "Improved best prediction mode(s) selection methods based on structural similarity in H.264 I-frame encoder," IEEE International Conference on Systems, Man and Cybernetics, pp. 2673-2678, 2005.

[6] Z. Mai, C. Yang, K. Kuang, and L. Po, "A novel motion estimation method based on structural similarity for H.264 inter prediction," IEEE International Conference on Acoustics, Speech, and Signal Processing, vol. 2, pp. 913-916, 2006.

[7] C. Yang, R. Leung, L. Po, and Z. Mai, "An SSIM-optimal MPEG4/H.264 AVC inter frame encoder," IEEE International Conference on Intelligent Computing and Intelligent Systems, vol. 4, pp. 291-295, 2009.

[8] C. Yang, H. Wang, and L. Po, "Improved inter prediction based on structural similarity in H.264," IEEE International Conference on Signal Processing and Communications, vol. 2, pp. 340-343, 2007.

[9] Y. H. Huang, T. S. Ou, P. Y. Su, and H. H. Chen, "Perceptual rate-distortion optimization using structural similarity index as quality metric," IEEE Trans. on Circuits and Systems for Video Technology, vol. 20, pp. 1614-1624, November 2010.

[10] H. Chen, Y. Huang, P. Su, and T. Ou, "Improving video coding quality by perceptual rate-distortion optimization," Proc. IEEE Int. Conf. Multimedia Exp, pp. 1287-1292, July 2010.

[11] P. Su, Y. Huang, T. Ou, and H. Chen, "Predictive Lagrange multiplier selection for perceptual-based rate-distortion optimization," Proc. 5th Int. Workshop Video Process. Qual. Metrics Consumer Electron., January 2010.

[12] Y. Huang, T. Ou, and H. H. Chen, "Perceptual-based coding mode decision," Proc. IEEE Int. Symp. Circuits Syst., pp. 393-396, May. 2010.

[13] T. Ou, Y. Huang, and H. Chen, "A perceptual-based approach to bit allocation for H.264 encoder," SPIE Visual Communications and Image Processing, July 2010.

[14] C.-W. Tang, C.-H. Chen, Y.-H. Yu, and C.-J. Tsai, "Visual sensitivity guided bit allocation for video coding," IEEE Trans. on Multimedia, vol. 8, no. 1, pp. 11-18, February 2006.

[15] C.-W. Tang, "Spatial temporal visual considerations for efficient video coding," IEEE Trans. on Multimedia, vol. 9, no. 2, pp. 231-238, January 2007.

[16] C. Sun, H.-J. Wang, and H. Li, "Macroblock-level rate-distortion optimization with perceptual adjustment for video coding," Proc. IEEE DCC, p. 546, 2008.

[17] F. Pan, Y. Sun, Z. Lu, and A. Kassim, "Complexity-based rate distortion optimization with perceptual tuning for scalable video coding," International Conference on Image Processing, 2005.

[18] J. Chen, J. Zheng, and Y. He, "Macroblock-level adaptive frequency weighting for perceptual video coding," IEEE Trans. on Consumer Electronics, vol. 53, pp. 775-781, May. 2007.

[19] Toshiba, "Adaptive quantization matrix selection," in ITU WP3/SC16 Delayed contribution 267, T05-SG16-060403-D-0266, Geneva, April 2006.

[20] T. Suzuki, P. Kuhn, and Y. Yagasaki, "Quantization tools for high quality video," Joint Video Team of ISO/IEC MPEG and ITU-T VCEG JVTB067, January 2002.

[21] T. Suzuki, K. Sato, and Y. Yagasaki, "Weighting matrix for JVC codec," Joint Video Team of ISO/IEC MPEG & ITU-T VCEG JVT-0053, May. 2002.

[22] J. Malo, J. Gutierrez, I. Epifanio, F. Ferri, and J. M. Artigas, "Perceptual feedback in multigrid motion estimation using an improved DCT quantization," IEEE Trans. on Image Processing, vol. 10, pp. 1411-1427, October 2001.

[23] J. Lee, "Rate-distortion optimization of parameterized quantization matrix for mpeg-2 encoding," International Conference on Image Processing, vol. 2, pp. 383-386, October 1998.

[24] E. Yang and X. Yu, "Rate distortion optimization for H.264 inter-framevideo coding: A general framework and algorithms," IEEE Trans. on Image Processing, vol. 16, pp. 1774-1784, July 2007.

[25] M. Karczewicz, Y. Ye, and I. Chong, "Rate distortion optimized quantization," VCEG-AH21, January 2008.

[26] S. Lyu and E. P. Simoncelli, "Statistically and perceptually motivated nonlinear image representation," Proc. SPIE Conf. Human Vision Electron. Imaging XII, vol. 6492, pp. 649 207-1-649 207-15, January 2007.

[27] Q. Li and Z. Wang, "Reduced-reference image quality assessment using divisive normalization-based image representation," IEEE Journal of Selected Topics In Signal Processing, vol. 3, pp. 202-211, April 2009.

[28] A. Rehman and Z. Wang, "Reduced-reference SSIM estimation," International Conference on Image Processing, September 2010.

[29] J. Malo, I. Epifanio, R. Navarro, and E. P. Simoncelli, "Non-linear image representation for efficient perceptual coding," IEEE Trans. on Image Processing, vol. 15, pp. 68-80, January 2006.

[30] J. Portilla, V. Strela, M. J. Wainwright, and E. P. Simoncelli, "Image denoising using scale mixtures of Gaussians in the wavelet domain," IEEE Trans. on Image Processing, vol. 12, pp. 1338-1351, November 2003.

[31] S. Channappayya, A. C. Bovik, and J. R. W. Heathh, "Rate bounds on SSIM index of quantized images," IEEE Trans. on Image Processing, vol. 17, pp. 1624-1639, September 2008.

[32] X. Li, N. Oertel, A. Hutter, and A. Kaup, "Laplace distribution based Lagrangian rate distortion optimization for hybrid video coding," IEEE Trans. on Circuits and Systems for Video Technology, vol. 19, pp. 193-205, February 2009.

[33] E. Y. Lam and J. W. Goodman, "A mathematical analysis of the DCT coefficient distributions for images," IEEE Trans. on Image Processing, vol. 9, no. 10, pp. 1661-1666, October 2000.

[34] X. Zhao, J. Sun, S. Ma, and W. Gao, "Novel statistical modeling, analysis and implementation of rate-distortion estimation for MPEG4/H.264 AVC coders," IEEE Trans. on Circuits and Systems for Video Technology, vol. 20, pp. 647-660, May. 2010.

[35] "Joint video team (JVT) reference software [online]," http://iphome.hhi.de/suchring/tml/download/old-jm.

[36] G. Bjontegaard, "Calculation of average PSNR difference between RD curves," Proc. ITU-T Q.6/SG16 VCEG 13th Meeting, Austin, Tex., April 2001.

[37] Z. Wang, L. Lu, and A. C. Bovik, "Video quality assessment based on structural distortion measurement," Signal Processing: Image Communication, vol. 19, pp. 121-132, February 2004.

What is claimed is:

1. A computer-implemented method of perceptual video coding utilizing a structural similarity-based divisive normalization approach, comprising:

producing a prediction residual by subtracting a current frame of video footage from a prediction from one or more previously coded frames while coding the current frame;

transforming the prediction residual to form a set of transform coefficients;

utilizing a transform domain structural similarity index to determine a divisive normalization factor for each transform coefficient;

adjusting a quantization parameter by adding a factor proportional to the logarithm of the divisive normalization factor;

quantizing the transform coefficients using the adjusted quantization parameter to obtain normalized and quantized coefficients; and performing a rate-distortion optimization and entropy coding on the normalized and quantized coefficients.

2. The method of claim 1, further comprising approximating the structural similarity divisive normalization factor based on estimating the energy of AC coefficients in the current frame by applying a scale factor to the energy of the corresponding coefficients in one or more previously coded frames that are neighboring frames to the current frame.

3. The method of claim 1, further comprising quantizing the quantization parameter value to an integer number, so as to make the codec compatible with MPEG4/H.264 AVC and HEVC standards.

4. The method of claim 1, further comprising performing rate-distortion optimization on normalized coefficients, wherein a Lagrange parameter is determined by utilizing an approximation model or a lookup table comprising one or more input arguments that are at least one of the following: a quantization step; and one or more parameters of a prior distribution of a normalized coefficient.

5. The method of claim 1, further comprising adjusting the divisive normalization factors based on local content of the video frame, where the local content may be characterized by a local complexity measure computed as local contrast, local energy or local signal activities.

6. The method of claim 5, further comprising spatially adapting the divisive normalization factor for each transform unit (TU), which may be blocks with variable sizes across space.

7. The method of claim 6, further comprising dividing the TU to smaller blocks of equal size in the whole frame and then average the divisive normalization factors for all small blocks within the TU.

8. The method of claim 7, further comprising normalizing local divisive normalization factor for each TU by the expected value of local divisive normalization factors of the whole frame being encoded.

9. A non-transient computer readable medium storing computer code that when executed on a computer device adapts the device to perform the method of claim 1.

10. The method of claim 1, further comprising:

performing an inverse divisive normalization transform on de-quantized coefficients; and utilizing inverse divisive normalization transformed coefficients of previously coded frames to determine the divisive normalization factors of the coefficients in the current frame.

11. A computer-implemented system for perceptual video coding utilizing a structural similarity-based divisive normalization approach, wherein the system is adapted to:

produce a prediction residual by subtracting a current frame of video footage from a prediction from one or more previously coded frames while coding the current frame;

transform the prediction residual to form a set of transform coefficients;

utilize a transform domain structural similarity index to determine a divisive normalization factor for each transform coefficient;

adjust a quantization parameter by adding a factor proportional to the logarithm of the divisive normalization factor;

quantize the transform coefficients using the adjusted quantization parameter to obtain normalized and quantized coefficients; and perform a rate-distortion optimization and entropy coding on the normalized coefficients.

12. The system of claim 11, wherein the system is further adapted to: approximate structural similarity divisive normalization factor based on estimating the energy of AC coefficients in the current frame by applying a scale factor to the energy of the corresponding coefficients in one or more previously coded frames that are neighboring frames to the current frame.

13. The system of claim 11, wherein the system is further adapted to quantize the QP value to an integer number, so as to make the codec compatible with MPEG4/H.264 AVC and HEVC standards.

14. The system of claim 11, wherein the system is further adapted to perform rate-distortion optimization on normalized coefficients, wherein a Lagrange parameter is determined by utilizing an approximation model or a lookup table comprising one or more input arguments that are at least one of the following: a quantization step; and one or more parameters of a prior distribution of a normalized coefficient.

15. The system of claim 11, wherein the system is further adapted to adjust the divisive normalization factors based on local content of the video frame, where the local content may be characterized by a local complexity measure computed as local contrast, local energy or local signal activities.

16. The system of claim 15, wherein the system is further adapted to spatially adapt the divisive normalization factor for each transform unit (TU), which may be blocks with variable sizes across space.

17. The system of claim 16, wherein the system is further adapted to divide the TU to smaller blocks of equal size in the whole frame and then average the divisive normalization factors for all small blocks within the TU.

18. The system of claim 17, wherein the system is further adapted to normalize local divisive normalization factor for each TU by the expected value of local divisive normalization factors of the whole frame being encoded.

19. The system of claim 11, wherein the system is further adapted to:

perform an inverse divisive normalization transform on de-quantized coefficients; and utilize inverse divisive normalization transformed coefficients of previously coded frames to determine the divisive normalization factors of the coefficients in the current frame.

* * * * *